United States Patent [19]

Salter

[11] Patent Number: 4,961,441
[45] Date of Patent: Oct. 9, 1990

[54] METHOD AND SYSTEM FOR CONTROLLING A PRESSURE REGULATOR

[76] Inventor: Stuart C. Salter, 2920 Dixie Hwy., Pontiac, Mich. 48055

[21] Appl. No.: 434,182

[22] Filed: Nov. 13, 1989

[51] Int. Cl.$^5$ .............................................. F16K 31/12
[52] U.S. Cl. .................................. 137/14; 251/30.02; 137/487.5
[58] Field of Search .............................. 137/14, 487.5; 251/30.02, 129.04; 364/510

[56] References Cited

U.S. PATENT DOCUMENTS

| | | | |
|---|---|---|---|
| 3,914,581 | 10/1975 | Gilson | 137/487.5 |
| 4,134,423 | 1/1979 | Mayer | 137/487.5 |
| 4,417,312 | 11/1983 | Cronin et al. | 137/487.5 |
| 4,550,747 | 11/1985 | Woodworth et al. | 137/487.5 |
| 4,673,162 | 6/1987 | Lachman | 251/30.05 |
| 4,679,583 | 7/1987 | Lucas et al. | 137/487.5 |
| 4,724,865 | 2/1988 | Hirono et al. | 137/487.5 |
| 4,789,001 | 12/1988 | Backe et al. | 137/624.13 |

*Primary Examiner*—A. Michael Chambers
*Attorney, Agent, or Firm*—Brooks & Kushman

[57] ABSTRACT

A method and system are provided for controlling a pressure regulator and an electric actuator mechanism for operating the pressure regulator by modifying a generated error signal as a function of at least one correction factor so that the actuator mechanism is controlled as a function of the actual level of regulated control fluid pressure to compensate for varying system operating conditions. A first correction factor is generated as a function of the difference between an actual pressure differential signal and an expected pressure differential signal. A second correction factor is based on the level of a feedback signal which is a function of the actual pressure of the regulated control fluid. An error signal generated by the method and system defines a ramp signal, wherein the shape of the ramp signal is defined by a data matrix of actual pressure differentials. The ramp signal may have a linear, exponential or a constant accelerationdeceleration shape. Preferably, the pressure regulator is a pilot operated pressure regulator and the actuator mechanism includes an up solenoid and a down solenoid.

19 Claims, 5 Drawing Sheets

| PRESSURE DIFFERENCE | EXPECTED STEP SIZE | CORRECTION FACTOR | ON TIME |
|---|---|---|---|
| 1 | .01 | 0 | 10 |
| 2 | .01 | 0 | 10 |
| 3 | .01 | 0 | 10 |
| . | . | . | . |
| . | . | . | . |
| 98 | .01 | 0 | 10 |
| 99 | .01 | 0 | 10 |
| 100 | .01 | 0 | 10 |

LINEAR RAMP CORRECTION TABLE

Fig. 4

| PRESSURE DIFFERENCE | EXPECTED STEP SIZE | CORRECTION FACTOR | ON TIME |
|---|---|---|---|
| 70 | 5 | 0 | 5000 |
| 50 | 3 | 0 | 3000 |
| 30 | 2 | 0 | 2000 |
| 20 | 1 | 0 | 1000 |
| 15 | .5 | 0 | 600 |
| 10 | .4 | 0 | 400 |
| 5 | .3 | 0 | 300 |
| 2.5 | .2 | 0 | 200 |
| 1 | .1 | 0 | 100 |
| .4 | .07 | 0 | 10 |

EXPONENTIAL RAMP CORRECTION TABLE

Fig. 6

Fig. 3 FLOW CORRECTION

Fig. 5 EXPONENTIAL CURVE APPROXIMATION

Fig. 7

| PRESSURE DIFFERENCE | EXPECTED STEP SIZE | ON TIME | CORRECTION FACTOR |
|---|---|---|---|
| 0 | .025 | 25 | 0 |
| .25 | .075 | 75 | 0 |
| 1 | .125 | 125 | 0 |
| 2.25 | .175 | 175 | 0 |
| 4 | .225 | 225 | 0 |
| 6.25 | .275 | 275 | 0 |
| 9 | .325 | 325 | 0 |
| 12.25 | .375 | 375 | 0 |
| 16 | .425 | 425 | 0 |
| 20.25 | .475 | 475 | 0 |
| 25 | .525 | 525 | 0 |
| 30.25 | .575 | 575 | 0 |
| 38 | .625 | 625 | 0 |
| 42.25 | .675 | 675 | 0 |

METHOD AND SYSTEM FOR CONTROLLING A PRESSURE REGULATOR

TECHNICAL FIELD

The present invention relates to methods and systems for controlling a pressure regulator and, in particular, to computerized methods and systems for controlling a pressure regulator.

BACKGROUND ART

Pressure regulators and, in particular, pilot operated pressure regulators are well known. Such pressure regulators typically include a pressure air input, a vent and two solenoids. One of the solenoids is commonly called an up solenoid and the other solenoid is commonly called a down solenoid. The solenoids regulate the input and vent, respectively, to carefully control a pilot signal pressure.

Oftentimes, an electronic pressure sensor is provided to monitor the pilot signal pressure. A computer, such as a microprocessor, controls the up and down solenoid positions in response to feedback from the pressure transducer to achieve a desired output pressure.

The U.S. Pat. No. 3,878,376 to Sholes, Jr. et al. discloses a computer-operated solenoid valve pressure control system having a number of solenoids which connect sources of pressurized gas, an atmospheric vent and a source of vacuum to pressure a volume. A pressure transducer senses the pressurized volume pressure and provides feedback to a computer controller. The pressurized volume is coupled to a pilot input signal of a pilot operated pressure regulator.

The U.S. Pat. No. 4,644,848 to McKendrick discloses an electro-pneumatic pressure regulator which utilizes a microprocessor to control a current to a pressure transducer which, in turn, supplies a pneumatic output signal to a pressure-to-pressure booster regulator.

The U.S. Pat. No. 4,394,871 to Czajka et al. discloses a programmable pressure regulator which is used in a metal forming operation. The system generates a regulated pressure in a line which has an input controlled by a solenoid connected to a source of pressurized gas and atmospheric vents regulated by solenoids. The line is connected to a cavity wherein a pressure transducer senses the pressure therein. The various solenoids and the pressure transducer are coupled to a comparator circuit which may be an analog device to regulate the solenoids in order to achieve a predetermined pressure time cycle.

Other patents of a more general interest include the U.S. Pat. Nos. to Clardy et al 3,348,032, Klem et al 3,794,070, Kawamura et al 4,477,183, Groeschner 4,512,362, McKendrick 4,680,441 and Appleby 4,718,454.

One problem with the methods and systems described by the prior art is the inability to match command or reference signals with the transducer feedback signal due to varying system operating conditions, such as heating, wear, varying lubrication levels, contamination, uneven or nonlinear operation and the like. The prior art methods and systems are also unable to compensate for different size solenoids, different types of regulators, different devices being controlled, different load levels wherein pressure is changing and uneven loads when the pressure is changing.

DISCLOSURE OF THE INVENTION

One advantage of the present invention is that the method and system control a pressure regulator, such as a pilot-operated pressure regulator wherein accurate control is accomplished by compensating for varying system operating conditions.

Another advantage of the present invention is that the computerized method and system control a pressure regulator, such as a pilot-operated pressure regulator, wherein an error signal is modified by a correction factor which is based on the difference between an actual pressure differential signal and an expected pressure differential signal.

Yet still another advantage of the present invention is that the computerized method and system control a pressure regulator, such as a pilot-operated regulator, wherein a pair of correction factors are utilized to modify an error signal, the first correction factor being based on the difference between an actual pressure differential signal and an expected pressure differential signal, and the second correction factor being based on the actual pressure of the control fluid.

In achieving the above advantages and other advantages of the invention, a method for controlling a pressure regulator and an electric actuator mechanism for operating the pressure regulator is provided. The method is utilized to control the pressure of control fluid regulated by the pressure regulator in response to a reference signal. The method includes the steps of generating feedback signals including a first feedback signal as a function of the actual pressure of the regulated control fluid, generating an error signal based on the difference between the reference signal and the feedback signals and generating a first control signal as a function of the error signal to control the actuator mechanism. The error signal is representative of a desired amount of control fluid pressure change. The method is characterized by the steps of generating an expected pressure differential signal based on the difference between the reference signal and the first feedback signal. Also, a second feedback signal is generated as a function of the pressure of the regulated control fluid in response to the first control signal. An actual pressure differential signal is generated as a function of the difference between the first and second feedback signals. A correction factor is generated, based on the difference between the actual pressure differential signal and the expected pressure differential signal. The error signal is modified as a function of the correction factor. A second control signal is generated as a function of the modified error signal to control the actuator mechanism as a function of the actual level of regulated control fluid pressure to compensate for varying system operating conditions.

Further in achieving the above advantages and other advantages of the present invention, a control system is also provided for implementing the above method.

Preferably, a second correction factor is also generated as a function of the level of the second feedback signal wherein the error signal is also modified as a function of the second correction factor. Also, preferably, the error signal is a ramp signal wherein the shape of the ramp signal is determined by a data matrix of actual pressure differentials. The difference between the reference signal and each feedback signal is correlated with the data matrix in generating the error signal.

In one embodiment, the ramp signal is a linear ramp signal. In a second embodiment, the ramp signal is an exponential ramp signal. In a third embodiment, the ramp signal is a constant acceleration/deceleration ramp signal.

In the described embodiment of the invention, each of the steps of generating the first and second feedback signals includes the step of measuring the actual pressure of the regulated control fluid with a pressure transducer to obtain a fluid pressure signal. The feedback signals are generated by modifying the pressure signals to compensate for varying pressure transducer operating characteristics.

The advantages accruing to the method and system of the present invention are numerous. For example, the method and system are capable of accurately matching a command or reference signal with a feedback transducer signal. The transducer signal may regulate the pressure of the pressure regulator, the position of an error cylinder being controlled by the air pressure or the speed of an air motor being controlled by the air pressure.

By being able to correct the error signal the method and system of capable of compensating for heating, wear, different levels of lubrication, contamination, uneven or nonlinear operation of any part of the controller or device being controlled.

The method and system are also capable of compensating for different size solenoids, different regulators, different devices being controlled and different or uneven loads when input pressure is changing. Consequently, actuator mechanisms, such as up/down solenoids, may be of different size.

By utilizing a second correction factor, the method and system is capable of compensating for differences in air flow in and out of the dome of a pilot-operated pressure regulator. The second correction factor is particularly important because air flow depends not only upon the time the solenoid is open, but on differential air pressure. In many applications, this replaces a vacuum source and a constant differential pressure valve.

The objects, features and advantages of the present invention are readily apparent from the following detailed description of the best mode for carrying out the invention when taken in connection with the accompanying drawings.

DESCRIPTION OF THE BEST MODE

Figure 1:
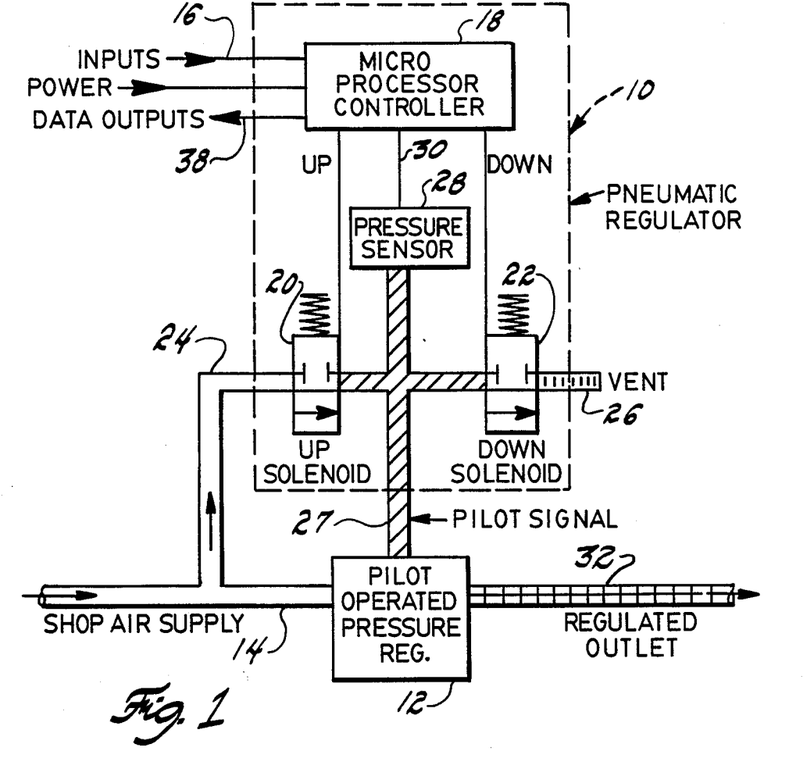
FIG. 1 is a schematic diagram illustrating a computer control system for controlling a pressure regulator, such as a pilot-operated pressure regulator, of the invention.

Referring now to the drawing figures, there is illustrated in FIG. 1 a system, generally indicated at 10, for controlling a pressure regulator such as pilot-operated pressure regulator 12 to control the pressure of a control fluid, such as a shop air supply appearing at line 14 in response to a reference signal, applied at line 16.

In general, the system 10 includes a microprocessor controller 18 which provides output control signals to an up solenoid 20 and down control signals to a down solenoid 22 to regulate the input and vent lines 24 and 26, respectively, to thereby accurately control pilot signal pressure on line 27.

A transducer such as an electronic pressure sensor 28 monitors the pilot signal pressure and provides an analog feedback signal along line 30 to enable the controller 18 to control the up and down solenoid positions of the up and down solenoids 20 and 22 to accurately follow the reference signal, appearing on the line 16. The pilot-operated pressure regulator 12 is supplied with high pressure air at line 14 and provides a regulated output at a pressure substantially equal to the pneumatic pilot signal at a regulated air outlet line 32.

Figure 2:
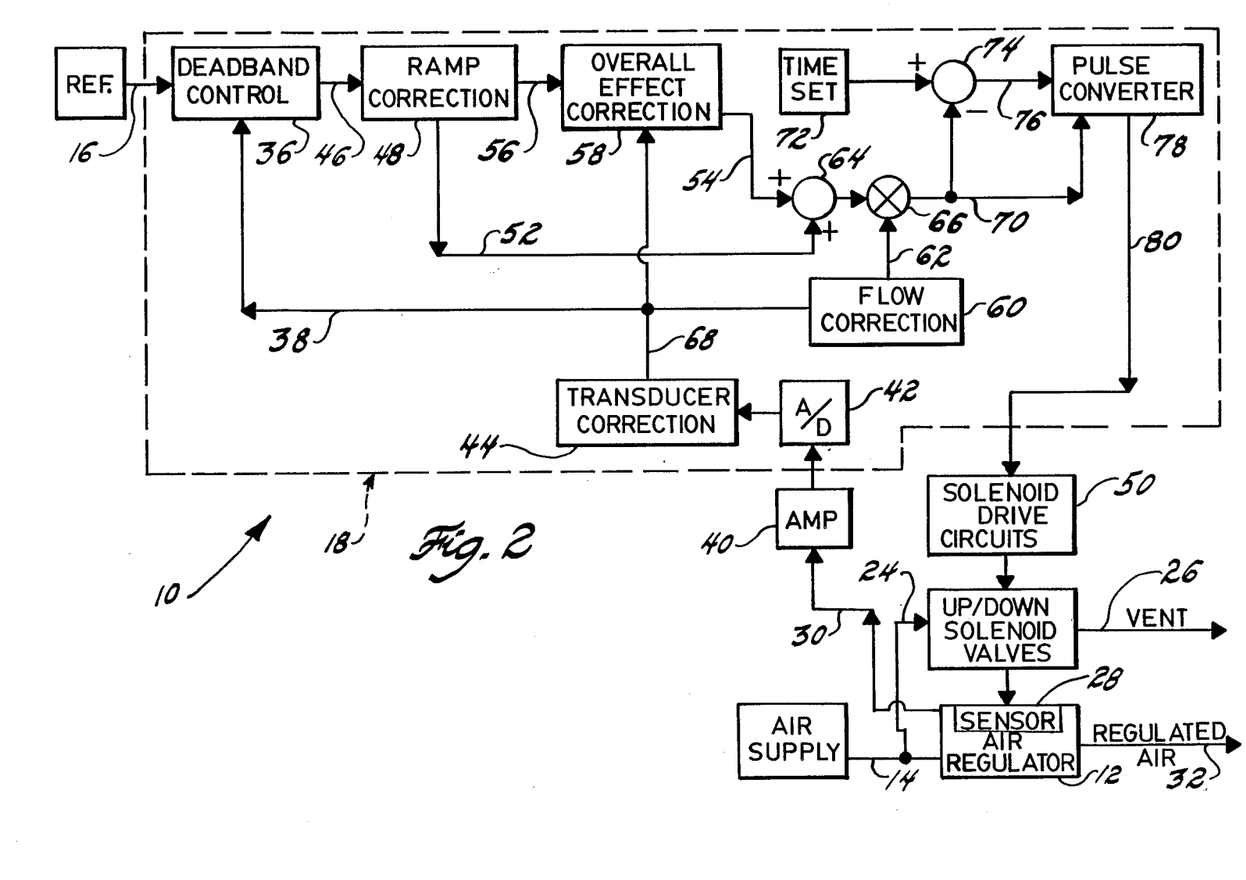
FIG. 2 is a schematic block diagram of the control system of the present invention.

Referring now to FIG. 2, the input reference signal appearing on line 16 is initially fed into a dead band control block 36 which defines a range of control fluid pressure, including the desired level of control fluid pressure established by the reference signal. The dead band control block 36 prevents the control system 10 from generating control signals when the actual fluid pressure is within the range of pressures defined by the dead band control block 36. In other words, the dead band control block 36 establishes a pressure deviation from a set pressure required before adjustment of pilot pressure. Where tight tolerance is not needed, the dead band can be wide.

When the system 10 is utilized as part of a larger computer control system, the dead band pressure established by the dead band control block 36 can be remotely adjusted and digital feedback can be supplied to the larger computer control system along line 38 of FIG. 1. Alternatively, the dead band utilized by the dead band control block 36 may be set by the user of the system by utilizing a dip switch to vary the dead band.

Typically, the microprocessor controller 18 spends much of its time in the dead band control block 36 to see if the actual air pressure is within the dead band. In other words, the dead band control block 36 periodically checks to see if the feedback signal appearing on line 38 from the sensor 28 is within the range of the reference signal on line 16 plus or minus the amount of the dead band. In this way, the dead band control block 36 reduces wear on the entire system.

As previously mentioned, the sensor 28 supplies a signal along line 30 which is representative of the actual pressure of the regulated control fluid, thereby obtaining a fluid pressure signal. The fluid pressure signal is amplified by an amplifier 40 and the amplified signal is sent to an analog-to-digital converter circuit 42 contained on the microprocessor controller 18. The converter circuit 42 sends a digital 8-bit word representation of the sensed fluid pressure signal to a transducer correction block 44 which is implemented by a table which the microprocessor looks to upon reading the digital signal from the converter circuit 42. The table implemented by the transducer correction block 44 is provided to compensate for significant irregularities and non-linearities to enable various pressure sensors or transducers to be utilized in the system 10. The table contains a number of correction factors one of which is chosen from the sensed air pressure. The chosen correction factor is added to or subtracted from the measured digital air pressure generated by the analog-to-digital converter circuit 42. The corrected signal appears on line 38 to the dead band control block 36.

Figure 9:
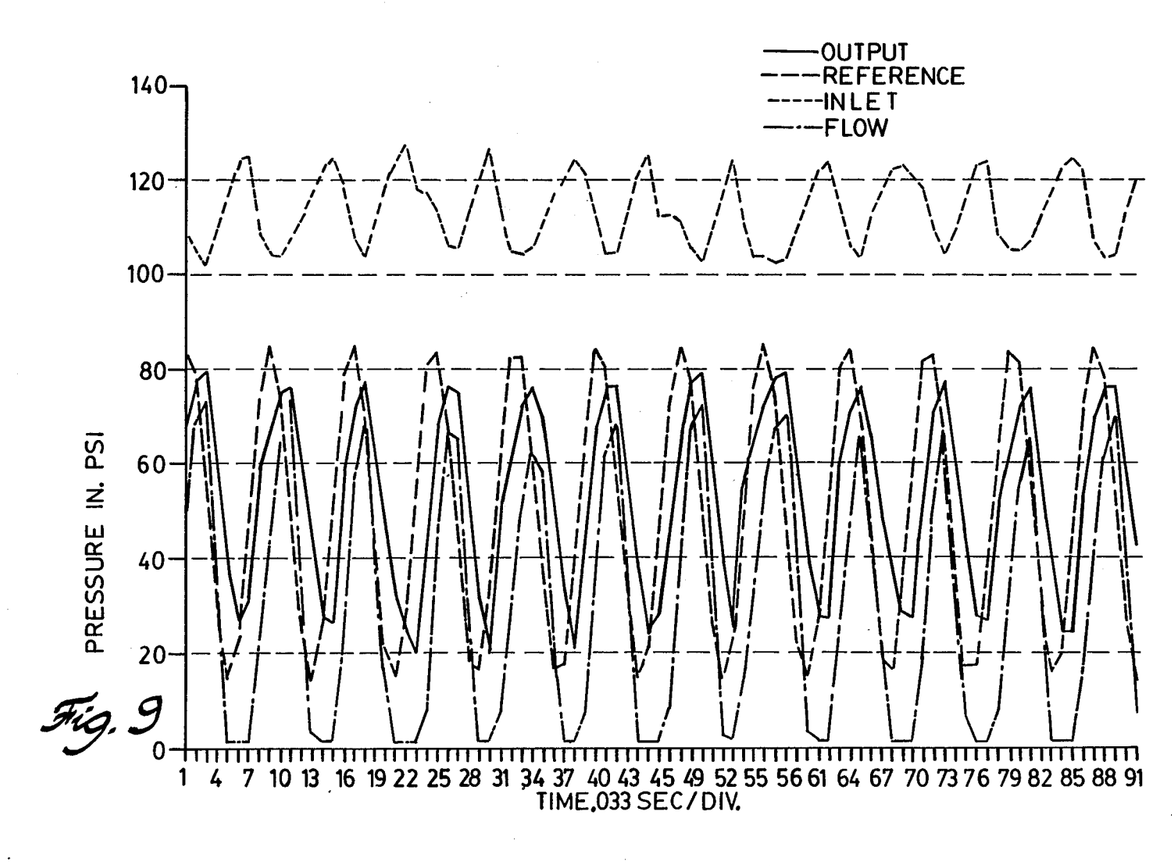
FIG. 9 is a graph illustrating the time relationship between output, reference, input and flow pressure versus time utilizing the method and system of the present invention.

When the absolute difference between a feedback signal appearing on line 38 and the reference signal appearing on line 16 is outside the dead band established by the dead band control block 36, the absolute pressure difference is sent along line 46 to a ramp correction block 48 which, in general, generates an error signal based on the difference between the reference signal such as the sinusoidal signal illustrated in FIG. 9 and the subsequent feedback signals. The error signal is representative of the desired amount of control fluid pressure change.

Figure 4:
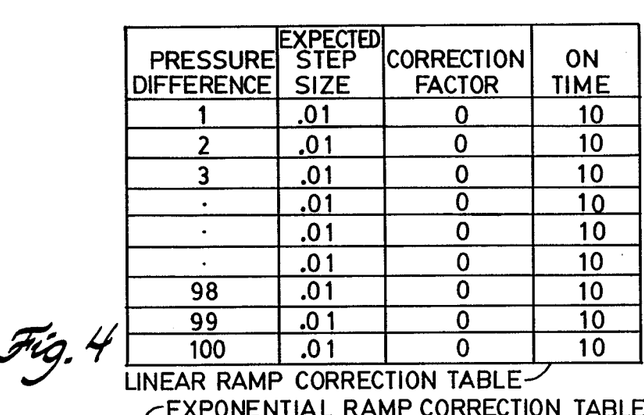
FIG. 4 is a linear ramp correction table implemented by the ramp correction block of FIG. 2 in a first embodiment of the present invention.
Figure 6:
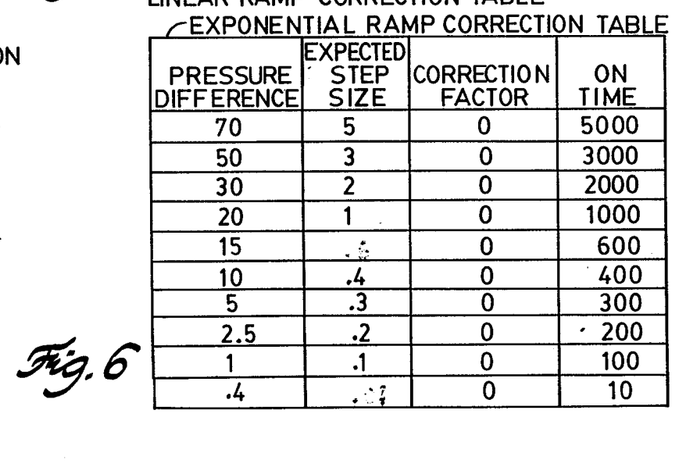
FIG. 6 is an exponential ramp correction table implemented by the ramp correction block of FIG. 2 in a second embodiment.
Figure 8:
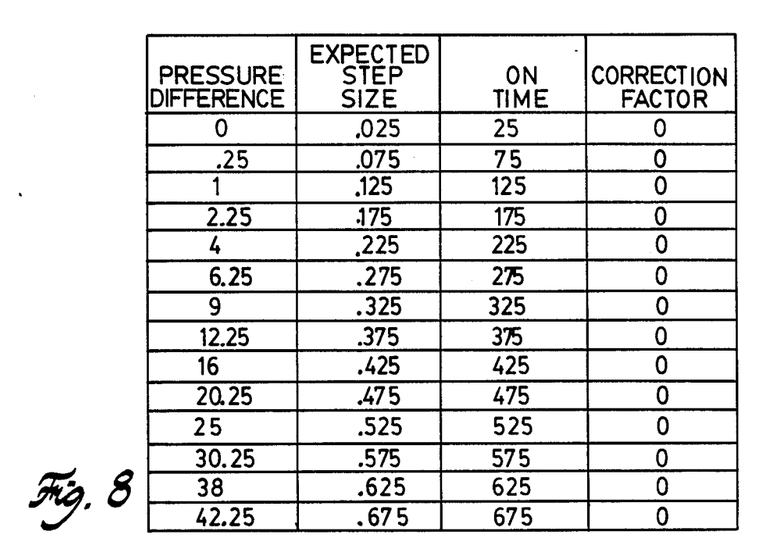
FIG. 8 is a constant acceleration/deceleration table implemented by the ramp correction block of FIG. 2 in a third embodiment.

In particular, the ramp correction block 48 implements either the linear ramp correction table of FIG. 4, the exponential ramp correction table of FIG. 6 or the constant acceleration/deceleration table of FIG. 8, depending on user requirements.

For example, if a linear ramp signal is required to be sent to solenoid drive circuits 50 for the up and down solenoid valves 20 and 22, respectively, the absolute signal difference (reference minus actual) is computed and a linear ramp routine is entered. For example, if a total pulse time of 6,000 time units is given, the "on time" of 10 time units in the table of FIG. 4 represents the time necessary to leave the up solenoid open to cause a 0.01 psi. change in pressure. Uncorrected solenoid "on time" for the linear ramp is constant at 10 time units, assuming a "0" correction factor. The signal representing 10 time units appears on line 52. A signal representing the "0" correction factor of FIG. 4 appears on line 54. A desired or expected pressure change signal representing the value 0.01 psi. appears on line 56 and is stored in an overall correction block 58.

Figure 3:
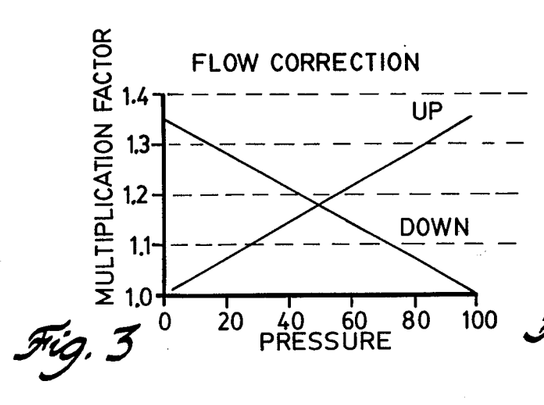
FIG. 3 is a graph which is implemented by the flow correction block of FIG. 2.

A flow correction block 60 implements a pair of look-up tables (i.e. up and down) which, in turn, implement the graph of FIG. 3 to obtain a multiplication factor which is output on line 62 from the flow correction block 60. The flow correction block 60 is necessary to supply the correction factor on line 62 since the amount of time to leave either the up or down solenoid on to produce a standard change in dome pressure varies depending upon the dome and inlet pressures. The look-up tables represented by the graph of FIG. 3 hold values which, when multiplied times the rapm correction, produce the expected change in dome pressure at 100 psi. inlet pressure.

Continuing the above example, if the controller 18 is ramping up from 79.99 to 80.00, the solenoid on time should be multiplied by approximately 1.3. In other words, the on time would be 13 and the off time would be 6,000 minus 13, which equals 5,983.

Due to device non-linearities, the standard pulse corrected by the multiplication factor on line 62 may not produce a 0.01 psi. change across the range. Consequently, a first correction factor must be provided along line 54 by the overall correction block 58 for addition at junction 64 to the signal appearing on line 52. The correction factor appearing on line 54 is added to the on time before flow multiplication which occurs at junction 66.

The generation of the first correction factor is now described. After the solenoid has been pulsed, the overall effect correction block 58 functions by comparing the actual change in fluid pressure (by monitoring line 68 from the transducer correction block 44) to the expected pressure differential signal or change which previously appeared on line 56. Based on the comparison, the first correction factor, proportional to the difference, is computed and if the actual pressure differential is approximately the same, the first correction factor is output on line 54 and is also stored in the correction table of FIG. 4 for the particular pressure difference (i.e. replaces the prior correction factor which in the table of FIG. 4 is "0") For example, if the change in air pressure was 15% too much, the correction factor would be a negative number representing 15% of the solenoid "on time". If the actual pressure differential is substantially different, then the correction factor for that pressure differential is output on line 54.

The resulting solenoid "on time" signal appears on line 70 and is subtracted from a constant time set by a time set block 72 at junction 74. The junction 74 outputs on line 76 an "off time" signal to a pulse converter block 78 which takes the off time signal on line 76 and the on time signal on line 70 to form the appropriate up or down pulse width modulated signal on line 80 to the solenoid drive circuits 50.

The time set in the time set block 72 is set by the user of the system 10, thereby selecting the speed of the system. The time within the time set block 72 may be input by dip switches or over line 16 and is read when the system 10 begins operation.

As previously mentioned, ramping may also be accomplished in the exponential fashion and operates in basically the same way as linear ramping, except for one difference in the flow correction block 60 as noted below. FIG. 6 comprises a look-up table which the microprocessor utilizes for exponential ramping.

As an example, assume actual pressure is 10 psi. and the reference signal is 45 psi. Consequently, there is an absolute pressure difference of 35 psi.

Looking at the table of FIG. 6, since there is no entry for 35 psi. and since 35 is less than 50 psi., the 30 psi entry is used. Expected pressure change would then be two psi. and the time would be 2,000 which appears on line 52 and a zero correction factor which appears on line 54. This figure is then multiplied at the junction block 66 by the flow correction factor appearing on line 62. The flow correction is derived by adding one-half the expected pressure change to the actual pressure, 10+2/2=11. This number is used to obtain the multiplication factor.

Figure 5:
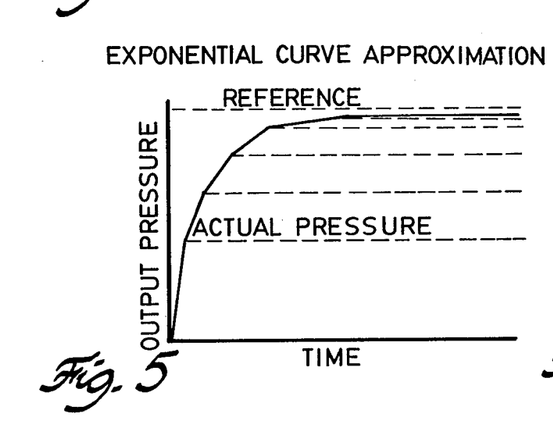
FIG. 5 is a exponential curve approximation graph which results upon implementation of the table of FIG. 6.

By utilizing the table of FIG. 4, an approximation of an exponential curve is obtained as shown in FIG. 5. This curve is composed of straight lines wherein the slope of the lines is controlled by the total pulse time (i.e. operating speed). As total pulse time becomes less, the "on pulses" come closer together, making air pressure rise faster (i.e. changing the slope).

Figure 7:
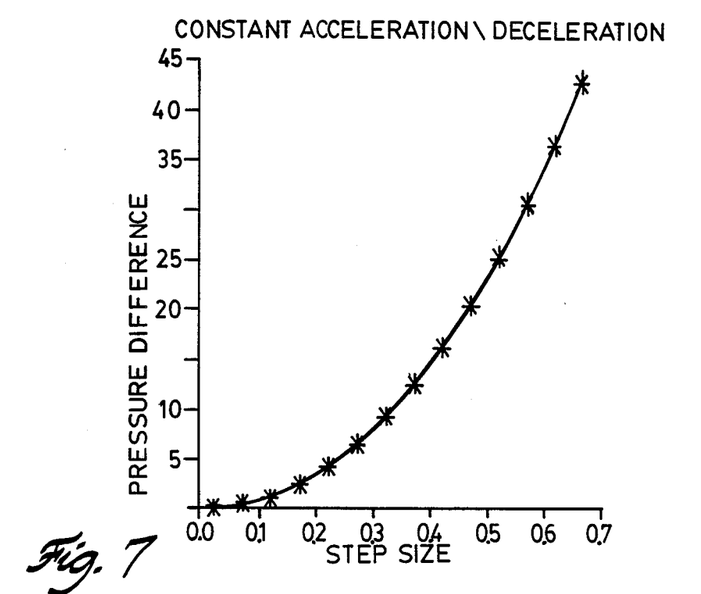
FIG. 7 is a constant acceleration/deceleration graph which illustrates the interrelationship between step size versus pressure difference when the ramp correction block of FIG. 2 is implemented with the table of FIG. 8.

Also, as previously mentioned, a constant acceleration/deceleration ramp signal may also be provided. The constant acceleration/deceleration ramp operates the same as the exponential ramp except for one basic difference. Assuming the actual pressure is 10 and the reference signal is 60, the computer will begin with a step size of 0.025 psi. and when it reaches 10.25 psi., the step size will change to 0.075 psi. When the pressure reaches 11 psi.(i.e. 10+1), the step size will change to 0.125 psi. This will continue until the computer is halfway to the reference pressure (i.e. 10 plus 25 equals 45 psi). Then the computer stops going up the table and starts going back down the table in a constant deceleration. The graph of FIG. 7 shows the step size versus pressure difference. Like the other ramp types, the slope of the curve is controlled by total pulse time.

With respect to any one of the ramp types, the sequence of steps determining on and off solenoid time is as follows:

(1) solenoid on time is determined from the correct ramp correction chart (i.e. tables of FIGS. 4, 6, or 8).

(2) Then the appropriate overall effect correction factor (i.e. first correction factor) is determined by block 58 and is also found in the ramp correction chart as a result of step 1 and is added at junction 64 to the signal appearing on line 52.

(3) As exemplified by flow correction block 60, the current actual pressure is determined from the transducer correction block 44 and this correction factor is output on line 62 and multiplied at junction block 66 to the result output from the junction block 64. This is the correct "on time" (i.e. modified error signal).

(4) Then the total "on time" is subtracted from the total pulse time set by the time set block 72 at block 74. This gives the "off time" signal on line 76.

(5) After pulsing the solenoid, performance is checked by first comparing the actual change in pressure within the overall correction block 58 to the expected pressure change appearing on line 56. If they do not match, the correction factor entry for the pressure differential must be increased or decreased proportionately within the corresponding table (i.e. table of FIG. 4 or FIG. 6 or FIG. 8). For example, if the on time was 85 and the prior correction factor 15, this gives a total of 100 before junction block 66. Assuming the pulse was 20% too low, the new correction factor would be negative five. This will give a total time of 85 plus (negative five) which equals 80 (i.e. the correct amount).

(6) This new correction factor is then stored within the overall correction factor block 58 (i.e. within the ramp correction table) for future use.

The method and system of the present invention provide numerous advantages. In particular, the overall correction block 58 which compares the actual change in pressure with the expected change in pressure for each pulse of the solenoid corrects for (1) variations in air inlet and/or outlet pressure, for example, variations in atmospheric pressure; (2) heating or worn solenoid/air regulator; (3) rough operation due to transducer drift; and (4) momentary inlet pressure drop to the regulator 12 when ramping.

Generally, the ability to vary the pulse width applied to the drive circuits 50 and the time between pulses allows the method to compensate for heating, wear, varying levels of lubrication, contamination and uneven or non-linear operation in any part of the system 10 or the regulator 12 or any device connected to the air regulator 12. The various correction factors also compensate for the different size solenoids, different regulators, different devices being controlled, such as a cylinder, different loads and uneven loads when the pressure is changing. Consequently, up and down solenoids may be of different size which may be useful when replacement parts may not be immediately available.

Another advantage of the present invention is that the shape of the error signal (i.e. ramp type) is variable. Three types of ramp types are available, including linear, exponential and constant acceleration/deceleration. This allows the method and system great flexibility to be utilized in multiple applications as a stand-alone controller.

Also, the speed at which the controller 18 matches the feedback signal is variable to also allow the method and system of the present invention to be utilized in multiple applications.

It is also to be understood that the transducer feedback signals may be the actual regulated pressure of the air regulator, the position of an air cylinder operated by the air regulator, or the speed of an air motor operated by the air regulator. The last two signals consequently are a function of the regulated pressure. Consequently, the system has the capability to maintain not only ramp slope, but also pressure when pressure is regulated and position when position is regulated and speed when speed is to be regulated.

The graphs of FIG. 9 are illustrative of the high accuracy of the method and system of the present invention when trying to match a sinusoidal reference signal, given that the inlet pressure is also sinusoidal in form.

While the best mode for practicing the invention has herein been described in detail, those skilled in the art to which this invention relates will recognize various alternative designs and embodiments for practicing the invention as defined by the following claims.

What is claimed is:

1. A method for controlling a pressure regulator and an electric actuator means for operating the pressure regulator to control the pressure of control fluid regulated by the pressure regulator in response to a reference signal, the method comprising the steps of: generating feedback signals including a first feedback signal as a function of the actual pressure of the regulated control-fluid; generating an error signal based on the difference between the reference signal and the feedback signals, the error signal being representative of a desired amount of control fluid pressure change; and generating a first control signal as a function of the error signal to control the actuator means, wherein the improvement comprises:

generating an expected pressure differential signal based on the difference between the reference signal and the first feedback signal;

generating a second feedback signal as a function of the pressure of the regulated control fluid in response to the first control signal;

generating an actual pressure differential signal as a function of the difference between the first and second feedback signals;

generating a correction factor based on the difference between the actual pressure differential signal and the expected pressure differential signal;

modifying the error signal as a function of the correction factor;

storing the correction factor; and generating a second control signal as a function of the modified error signal to control the actuator means as a function of the actual level of regulated control fluid pressure to compensate for varying system operating conditions.

2. The method of claim 1 wherein each of the steps of generating the feedback signals includes the step of measuring the actual pressure of the regulated control fluid with a pressure transducer to obtain a fluid pressure signal.

3. The method of claim 2 wherein each of the steps of generating the feedback signals includes the step of modifying the pressure signal to compensate for varying pressure transducer operating characteristics.

4. The method of claim 1 further comprising the steps of generating a second correction factor as a function of the level of the second feedback signal and modifying the error signal as a function of the second correction factor.

5. The method of claim 1 wherein the error signal is a ramp signal and wherein the shape of the ramp signal is determined by a data matrix of actual pressure differentials, the step of generating the error signal including the step of correlating the difference between the reference signal and each of the feedback signals with the data matrix.

6. The method of claim 1 wherein the step of generating the second control signal includes the step of converting the modified error signal to a pulse width modulated control signal.

7. The method of claim 1 wherein the pressure regulator is a pilot operated pressure regulator and the actuator means includes an up solenoid and a down solenoid.

8. A control system for controlling a pressure regulator to control the pressure of control fluid regulated by the pressure regulator in response to a reference signal, the control system including electric actuator means adapted to be coupled to the pressure regulator for operating the pressure regulator as a function of control signals, feedback means for generating feedback signals including a first feedback signal as a function of the actual pressure of the regulated control fluid; means for generating an error signal as a function of the difference between the reference signal and the feedback signals, and control means for generating a control signal as a function of the error signal to control the actuator means, the feedback means generating a second feedback signal as a function of the pressure of the regulated control fluid in response to the control signal; the error signal being representative of a desired amount of control fluid pressure change, wherein the improvement comprises:

means for generating an expected pressure differential signal based on the difference between the reference signal and the first feedback signal;

means for generating an actual pressure differential signal as a function of the difference between the first and second feedback signals;

means for generating a correction factor based on the difference between the actual pressure differential signal and the expected pressure differential signal;

means for storing the correction factor; and error signal modifying means for modifying the error signal as a function of the correction factor, the control means generating a second control signal as a function of the modified error signal to control the actuator means as a function of the actual level of control fluid pressure to compensate for varying system operating conditions.

9. The control system of claim 8 wherein the feedback means includes a pressure transducer for measuring the actual pressure of the regulated control fluid to obtain a pressure signal.

10. The control system of claim 9 wherein the feedback means includes pressure signal modifying means for modifying the pressure signal to compensate for varying pressure transducer operating characteristics.

11. The control system of claim 8 further comprising means for generating a second correction factor as a function of the level of the first feedback signal and second error signal modifying means for modifying the error signal as a function of the second correction factor.

12. The control system of claim 8 wherein the error signal is a ramp signal and wherein the shape of the ramp signal is determined by a data matrix of actual pressure differentials.

13. The control system as claimed in claim 12 including correlating means for correlating the difference between the reference signal and each of the feedback signals with the data matrix to generate the error signal.

14. The control system of claim 8 wherein the control means includes converter means for converting the modified error signal to a pulse width modulated control signal.

15. The control system of claim 12 wherein the ramp signal is a linear ramp signal.

16. The control system of claim 12 wherein the ramp signal is an exponential ramp signal.

17. The control system of claim 12 wherein the ramp signal is a constant acceleration/deceleration ramp signal.

18. The control system of claim 8 wherein the pressure regulator is a pilot operated pressure regulator and the actuator means includes an up solenoid and a down solenoid.

19. The control system of claim 8 further comprising dead band control means for defining a range of control fluid pressures including the desired level of control fluid pressure, the dead band control means preventing said control means from generating control signals when the actual fluid pressure is within said range.

* * * * *